Aug. 8, 1961
A. E. DUKLER ET AL
2,995,499
APPARATUS FOR FRACTIONAL DISTILLATION OF
MUTIPLE COMPONENT MIXTURES
Filed Dec. 11, 1958
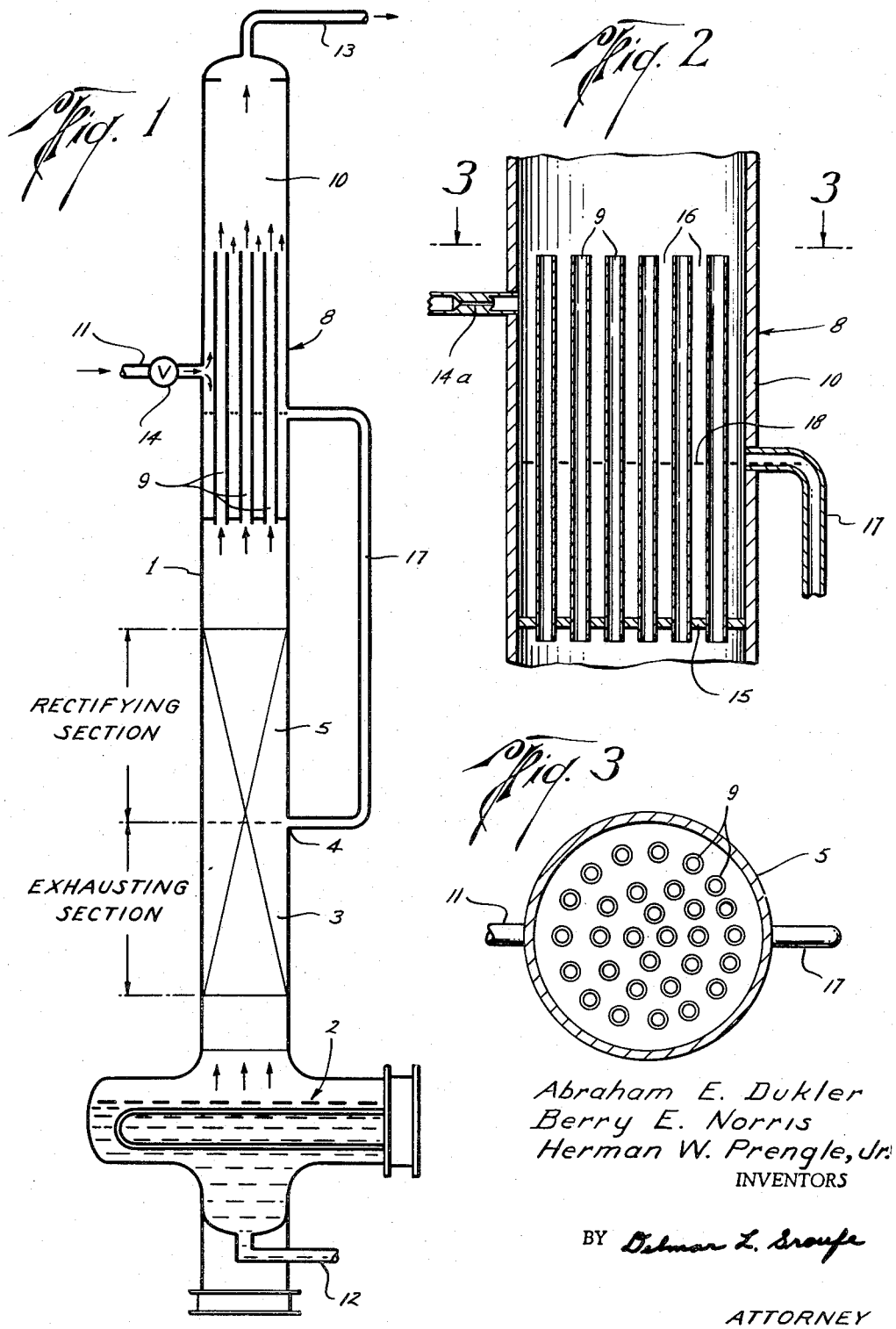
Abraham E. Dukler
Berry E. Norris
Herman W. Prengle, Jr.
INVENTORS
BY *Delmar L. Stroufe*
ATTORNEY

United States Patent Office 2,995,499
Patented Aug. 8, 1961

2,995,499
APPARATUS FOR FRACTIONAL DISTILLATION OF MULTIPLE COMPONENT MIXTURES
Abraham E. Dukler, Berry E. Norris, and Herman W. Prengle, Jr., Houston, Tex., assignors, by mesne assignments, to Maloney-Crawford Tank and Manufacturing Company, Tulsa, Okla., a corporation of Delaware
Filed Dec. 11, 1958, Ser. No. 779,601
2 Claims. (Cl. 196—100)

This invention relates to fractionation devices and consists, particularly, in a novel unit for fractional separation of high vapor pressure components and gases from the higher boiling fractions of distillate, natural gasoline and other liquid mixtures containing a substantial proportion of such high vapor pressure components and gases.

In order to remove the lower-boiling fractions from a well head separator, or natural gasoline from an absorber or other recovery unit, or other liquid mixture containing lower boiling components, it is the usual practice to process the mixture in a distillation tower, customarily designated as a stabilizer, having as a principal element a packed column, bubble trays or other rectifying means. In most field stabilizer installations, the feed liquid serves as the sole downcomer liquid. The feed flows down through an exhausting section of the fractionating column of such units and there is no rectifying section above the feed inlet into the column because no reflux is available. With stabilizers of this type excessive losses of heavier fractions are permitted to leave the unit in the light components discharged from the top of the column. In larger field plants or natural gasoline refinery installations, such losses are reduced to a minimum by the use of stabilizers which are equipped with rectifying sections and with overhead condensers or reflux systems. In such stabilizers the higher boiling fractions in the overhead vapor are condensed to provide reflux for the rectifying sections by the use of cooling or refrigeration, requiring in each instance cooling water, electrical power, or other utilities. These systems do not provide a practical means of obtaining reflux in field installations where the necessary cooling water or other utilities are not readily available or cannot be economically provided.

Accordingly, it is an object of the present invention to provide a stabilizer for use in oil and gas fields having simpler and more efficient fractionating means than have heretofore been available.

Another object is to provide for field use, a distillation method and means incorporating an efficient reflux system without the use of cooling water or other utilities.

Another object is to provide a distillation method and means in which cooling necessary for condensation of reflux is accomplished by reduction of pressure upon an entering fluid containing low boiling fractions to produce initial evaporation and expansion of a portion thereof with resulting cooling of the entering fluid and cooling of the vapor rising from a rectifying section of the unit by heat exchange contact of said vapor with the cooled fluid so as to condense higher boiling fractions from said vapor.

Another object is to provide, for use in field locations, a distillation unit having a fractionating column, a means for reducing pressure upon an entering fluid feed containing volatile fractions so as to lower the temperature of said entering fluid and by heat exchange means utilizing the cooled entering fluid to cool higher boiling fractions of vapors rising from the fractionating column of the unit.

These objects and others which will be apparent from the following description, claims and drawings are all attained by our fractionation unit which includes a reboiler and an exhausting section in the lower part thereof and a rectifying section and condenser in the upper part. The entering fluid is normally delivered to the unit at the pressure available from the source of said fluid which may be a well head separator, a holding vessel, or the like. It passes through a restriction or pressure reducing valve and then into the condenser section of our fractionating unit. By markedly reducing the pressure on the entering feed the pressure reducing valve causes an initial flashing of vapor from the feed as it enters the condenser, thus cooling both the liquid portion of the feed itself and, by heat exchange, also cooling vapors rising from the fractionating column which are caused to pass through tubes in the condenser. In order to maintain the condenser tubes cool, the cooled stream of incoming liquid is caused to flow through the condenser in a pool maintained adjacent the condenser tubes from which the stream overflows and is conducted to a feed inlet in the fractionating column therebeneath. Cooling of the rising vapors causes condensation of a higher boiling portion thereof which passes downwardly into the fractionating column as reflux. Accordingly, we provide an efficient fractionating column for fractional distillation in which the reflux is condensed by evaporative cooling obtained by pressure reduction of the entering fluid itself and without recourse to cooling water, electrical power, or other auxiliaries heretofore thought necessary to provide the necessary reflux for a rectifying section in a fractionation unit.

In the accompanying drawings which illustrate the invention, FIG. 1 is a diagrammatic view showing a stabilizer unit embodying the invention.

FIG. 2 is an enlarged vertical transverse section illustrating the condenser section of the stabilizer.

FIG. 3 is a transverse section taken substantially on line 3—3 of FIG. 2.

FIG. 1 shows a distillation tower or stabilizer unit for use in fractional distillation processes, including a fractionating section which may be a bubble column or any other rectifying or fractionating means, such as the indicated column, for fractional distillation by counter-flow contacting of down coming feed and reflux liquid with rising vapors. The fractionating section of the stabilizer is sometimes hereafter referred to as the fractionating column; this term should not be confused with the term "distillation tower" used herein to designate the entire distillation unit or stabilizer unit. The distillation tower illustrated in this figure has a casing 1, a reboiler generally indicated at 2 which is connected by suitable conventional means (not shown) to a source of heat energy such as a gas burner or steam line, an exhausting section 3 comprising the portion of the fractionating column, or section, below the fractionating feed inlet 4, a rectifying section 5 of said column disposed above said feed inlet, and a condenser section indicated generally at 8.

The condenser designated by the numeral 8 may be of any suitable or desired type or design including various well known types having horizontal, vertical or spiral tubes. The presently preferred embodiment illustrated in the drawings includes a plurality of parallel, substantially vertical tubes 9, each open at the top and bottom and extending from the portion of the casing 5 immediately above the rectifying portion of the column into the upper portion 10 of the casing. A feed pipe or supply conduit 11 connects the casing adjacent to the condenser section to the well head separator or other source of distillate-type feed which is supplied to the conduit 11 at a pressure substantially above atmospheric pressure. A liquid discharge line 12 leads from the bottom of the casing and a gas discharge line 13 is provided at the top thereof. A variable restriction or expansion valve 14 is provided in the supply conduit 11 adjacent to the casing.

A pan or plate 15 traverses the casing substantially flush with or slightly above the lower extremities of tubes 9 and is sealingly secured to said tubes and said casing. It is necessary that the top portion of the condenser section be open to permit expansion and upward passage of vapor from the cooled supply liquid retained in the condenser; in the particular distillation unit illustrated in the drawings, the portion of the casing around tubes 9 is open into the top portion 10 of the column as indicated at 16. Suitable bracing structure may be provided at the top of tubes 9 as may be desired; however, any such structure should not interfere with vapors rising from the inlet feed as will be described. An overflow line 17 extends from a portion of the condenser section slightly below supply conduit 11 to column inlet 4 which passes into the packed column at an intermediate portion thereof.

FIG. 2 shows the condenser section in enlarged section. In this illustration restriction 14a is shown as an ordinary fixed orifice choke, but a variable orifice or expansion valve as indicated at 14 in FIG. 1 may be provided to be provided to be arranged as may be desired for controlling the stabilizer pressure or the pressure differential across the valve.

In operation, distillate from a well head separator or natural gasoline from a suitable natural gasoline recovery unit, or other feed supply mixture, enters the casing through supply conduit 11 at, say, 800 lbs. p.s.i. gauge pressure, past restriction 14 where its pressure is sharply reduced to the stabilizer operating pressure which, by way of example, may be 125–140 lbs. p.s.i. gauge pressure. The drop in pressure of the entering fluid produces an initial flashing of vapor from the feed liquid. The stabilizer itself may be designed to operate at any desired pressure and condenser temperature provided the inlet feed mixture at the supply pressure available will produce the necessary cooling when released into the column.

There is virtually no upper limit to the pressure ranges of the liquid supplied to the stabilizer which may be employed beneficially, nor may any arbitrary lower limit be set. It is only necessary that the pressure upstream and downstream of the pressure reducing means permit a sufficient pressure drop to give the desired cooling for the condensation of reflux liquid. It will be obvious that any supply pressure sufficiently above the operating pressure of the stabilizer may be utilized to produce cooling in the condenser so long as the supply pressure is sufficiently greater than the stabilizer pressure to cause low temperature flashing of the low boiling components of the feed with resultant cooling. Differential pressures for specific applications will vary with the feed composition, the desired bottom product's vapor pressure, and the amount of recovery obtainable at various operating conditions. However, for most gas field distillate compositions and the like a minimum differential pressure across the expansion valve of about three hundred pounds is necessary to give sufficient cooling to provide the desired reflux.

The vapors flashing in the condenser from the entering feed rise past tubes 9 into the upper portion 10 of the casing and the remaining cooled liquid portion of the entering feed fluid drops into the lower portion of the condenser section in the space formed around tubes 9 and above plate 15. These cooled vapors, gases and liquids absorb heat from vapors passing upwardly through tubes 9, resulting in condensation of the higher boiling fractions therefrom. The remaining vapors passing through tubes 9 continue their passage upwardly out of the tubes where they join the lower boiling fractions initially separated from the feed fluid in the upper part 10 of the casing and are discharged through gas delivery pipe 13.

Incoming feed liquid rises above plate 14 to the level of overflow pipe 17, as represented by dotted line 18, where it overflows through said pipe 17 downwardly to the fractionating section, passing through fractionating column inlet 4 and then its flow joins the downward flow of reflux liquid and the combined downward flow of liquid is caused to contact rising vapors in the lower exhausting or stripping section 3. After fractional distillation in this section the downcoming liquid passes into the reboiler. Reflux liquid, which is condensed in tubes 9 due to the cooling effect of heat exchange with the incoming cooled fluid, drops downwardly through the tubes 9 into the upper, rectifying portion of the packed column, flowing downwardly through the rectifying section and exhausting section in counter-current vapor-liquid contact with the rising vapors originating from the reboiler and passing up the column. Thus, the overflowing cooled feed liquid from the condenser and the reflux liquids are brought into intimate contact with rising vapors in the packed column to effect an efficient fractional separation of lower from higher boiling fractions of the feed.

The lower boiling fractions of the feed, i.e., the vaporous and gaseous components are withdrawn from the upper part 10 of the stabilizer through gas discharge pipe 13, while the higher boiling fractions of the feed pass into the lower part of the column where they are withdrawn through liquid discharge pipe 12 for use or, if desired, additional fractionation or other treatment.

Accordingly, by our invention an efficient fractionating unit or distillation tower has been provided in which fluid entering the unit, chilled as a result of its drop in pressure, cools and partially condenses the vapors rising from the fractionating column of the tower, while the reflux produced by such condensation falls back into the fractionating column. Thus, there is provided an overhead condensing system and a means for providing reflux to the fractionating column without the need for external cooling means or expensive utilities. Moreover, in the presently preferred embodiment of our invention reflux and feed liquid are supplied to the fractionating section of the unit by gravity flow alone. In addition, in accordance with our invention the reflux may be efficiently utilized, as shown in the preferred embodiment disclosed herein, by positioning the feed inlet into the column to provide a rectifying section in the fractionating column.

By way of further illustration of our invention, the following comparative performance data are taken from the operation of fractionating units installed at a location in a natural gas field in Texas for the processing of the condensate from a gas well as recovered from a high pressure separator. The unit designated below as a "field stabilizer with refluxing means" is a distillation unit constructed in accordance with our invention, employing a 10¾ inch diameter tower 23 ft. 6¼ inches from seam to seam and having a packed section for the fractionating column.

*Feed composition*

| Component: | Mole percent |
|---|---|
| Methane | 28.1 |
| Ethane | 11.2 |
| Propane | 17.2 |
| Butane | 12.2 |
| Pentane | 5.7 |
| Hexanes | 6.5 |
| Heptane and heavier (125 molecular weight) | 19.1 |

*Operating data from field stabilizer with refluxing means*

| | |
|---|---|
| Pressure of feed_____p.s.i.g.___ | 1000 |
| Tower pressure_____p.s.i.g.___ | 120 |
| Bottoms product Reid vapor pressure___p.s.i.___ | 9.2 |
| Reboiler temperature_____°F.___ | 295 |
| Feed supply temperature_____°F.___ | 94 |
| Temperature of feed liquid in condenser section_____°F.___ | 58 |
| Temperature of vapors leaving packed section_____°F.___ | 114 |
| Temperature of vapors leaving tower___°F.___ | 85 |
| Bottoms product recovery, percent of feed_____ | 57.9 |

At the same field location, the above unit was converted into a conventional field stabilizer with the same dimensions, the same packed column, and the same construction as the above embodiment of our invention excepting it did not utilize a condenser section. In this unit the feed passed through an expansion valve to reduce the pressure to tower pressure and then it was immediately introduced in the conventional manner at the top of the packed column, thereby employing the entire packed column as an exhausting section with no reflux. Comparative performance data from this unit is as follows:

*Operating data from conventional field stabilizer*

| | | |
|---|---|---|
| Pressure of feed | p.s.i.g. | 1000 |
| Tower pressure | p.s.i.g. | 120 |
| Product Reid vapor pressure | p.s.i. | 9.7 |
| Reboiler temperature | °F. | 289 |
| Feed supply temperature | °F. | 84 |
| Temperature of vapors leaving packed section | °F. | 111 |
| Temperature of vapors leaving tower | °F. | 111 |
| Bottoms product recovery, percent of feed | | 51.5 |

In order to provide comparative data relating to the operation and the product recoveries from the two types of units, the feed composition and supply pressure were essentially the same in both tests.

The data obtained from comparative tests indicate clearly that for a comparable product vapor pressure, the recovery for the unit constructed in accordance with this invention is substantially increased over the conventional field unit operated without reflux, as in the above examples of test data in which more than 12% improved recovery over the conventional stabilizer was obtained by the use of the method and apparatus of the present invention. Further, these data demonstrate that in the conventional stabilizer the vapors which leave the packing (or other vapor-liquid contacting means) at a specific temperature (such as the 111° F. vapor temperature noted above) leave the column at this temperature and none of the components are recovered. In distillation units embodying our invention, the vapors leaving the packed section are cooled before leaving the tower by heat exchange in the condenser section (as in the above test of such a unit in which these vapors were cooled from 114° F. to 85° F.) and thereby the heavier components are condensed and returned to the packed column.

The above illustrative data are not to be considered in anw way as limiting conditions in the practice of our invention, but are set forth in order that this invention may be more fully understood.

The above illustrative data are not to be considered in any way as limiting conditions in the practice of our invention, but are set forth in order that this invention may be more fully understood.

Various changes in size, shape and materials, as well as in details of the illustrated embodiments of our invention may be made without departing from the spirit thereof and it will be apparent that many modifications and derivations of our invention may also be made without departure from the true teachings thereof. Moreover, certain features and sub-combinations of our invention are of utility and may be employed without reference to other features and sub-combinations and this is contemplated by and within the scope of the claims. We therefore contemplate, by the appended claims to cover any such changes, modifications and sub-combinations as fall within the true spirit and scope of our invention.

What we claim as new and desire to secure by Letters Patent is:

1. In a distillation unit, a casing, a supply conduit communicating intermediately therewith for connection with a source of fluid under pressure, vapor and liquid contacting means in the lower part of said casing comprising a lower exhausting section and an upper rectifying section, liquid and gas discharge means leading, respectively, from the bottom and top of said casing, a liquid collecting plate in said casing below said inlet pipe, vapor ducts passing through said plate and leading past said inlet pipe for conducting vapors from said vapor and liquid contacting means into the upper portion of said casing, means for conducting reflux liquids condensing in said vapor ducts to said vapor-liquid contacting means, expansion means in said supply conduit for causing pressure reduction of the fluid issuing into the said casing and initial evaporation therefrom with resulting cooling, the separated, cooled liquid fraction being retained temporarily above said plate to cool said vapor ducts and condense the higher boiling fractions from the vapors rising from said vapor-liquid contact means, and overflow means for passing said cooled liquid to said vapor-liquid contact means between said exhaust and rectifying sections as feed.

2. In a distillation unit, a casing, a fluid supply conduit for connection with a source of fluid under pressure and communicating intermediately with said casing, liquid and vapor discharge pipes leading, respectively, from the bottom and top of said casing, a pan traversing said casing below said inlet, substantially parallel tubes opening through said pan and connecting the upper and lower parts of said casing, said casing above said pan being open around said tubes into the upper part of the casing to permit vapors separated from the free upper surface of the collected fluid to pass upwardly around said tubes into the upper part of said casing, a fractionating column disposed below said pan including exhaust and rectifying sections, an overflow pipe passing through said casing between said pan and the inlet of said supply conduit so as to retain liquid issuing from said supply conduit above said pan and to cause the overflow from said collected body of liquid to be conducted to said fractionating column between said sections, heating means below said fractionating column, and a restriction in said supply conduit adjacent said casing adapted to cause pressure reduction in said fluid with resultant evaporation and cooling of the fluid entering said casing and thereby causing initial separation of vapor from said entering liquid and cooling of said liquid, and also causing cooling of vapor passing upwardly through said tubes and condensation of higher boiling fractions of said vapors to provide reflux liquid to fall downwardly out of said tubes and into said rectifying section.

References Cited in the file of this patent

UNITED STATES PATENTS

| | | |
|---|---|---|
| 1,819,760 | Whitman et al. | Aug. 18, 1931 |
| 1,952,225 | Wallis et al. | Mar. 27, 1934 |
| 2,013,992 | Roberts et al. | Sept. 10, 1935 |
| 2,134,882 | Monro | Nov. 1, 1938 |